(12) United States Patent
Zhang et al.

(10) Patent No.: US 9,292,396 B2
(45) Date of Patent: Mar. 22, 2016

(54) SYSTEM AND METHOD FOR SECURE REMOTE DIAGNOSTICS

(71) Applicant: Dell Products, LP, Round Rock, TX (US)

(72) Inventors: Weijia Zhang, Austin, TX (US); Mark A. Young, Jarrell, TX (US); Jerry M. Jones, Round Rock, TX (US); Sumeet Kukreja, Round Rock, TX (US); Vance E. Corn, Austin, TX (US); Jon R. Hass, Austin, TX (US); William C. Edwards, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 192 days.

(21) Appl. No.: 13/954,195

(22) Filed: Jul. 30, 2013

(65) Prior Publication Data

US 2015/0039939 A1 Feb. 5, 2015

(51) Int. Cl.
*G06F 11/00* (2006.01)
*G06F 11/22* (2006.01)
*G06F 9/44* (2006.01)
*G06F 9/48* (2006.01)

(52) U.S. Cl.
CPC ........ *G06F 11/2284* (2013.01); *G06F 11/2294* (2013.01); *G06F 9/4401* (2013.01); *G06F 9/4843* (2013.01); *G06F 2011/2278* (2013.01)

(58) Field of Classification Search
CPC . G06F 11/2284; G06F 9/4401; G06F 9/4843; G06F 2011/2278
USPC ....................................... 714/27, 36
See application file for complete search history.

(56) References Cited

U.S. PATENT DOCUMENTS

| | | | |
|---|---|---|---|
| 5,594,633 A | 1/1997 | Asazawa | |
| 7,206,970 B1 * | 4/2007 | Lauterbach | G06F 11/2289 713/2 |
| 7,712,131 B1 * | 5/2010 | Lethe | G06F 21/57 701/29.1 |
| 8,086,834 B2 | 12/2011 | Brisky et al. | |
| 2003/0204709 A1 * | 10/2003 | Rich et al. | 713/1 |
| 2007/0234000 A1 | 10/2007 | Gujarathi et al. | |
| 2009/0150721 A1 * | 6/2009 | Kochar et al. | 714/6 |

* cited by examiner

*Primary Examiner* — Yair Leibovich
(74) *Attorney, Agent, or Firm* — Larson Newman, LLP

(57) ABSTRACT

An information handling system includes a processor and a management controller separate from the processor. The management controller is operable to boot the information handling system to a system service management module, direct the system service management module to execute diagnostics code on the processor and to store a result from the execution of the diagnostics code in a predetermined memory location. The management controller is also operable to retrieve the result from the predetermined memory location.

17 Claims, 3 Drawing Sheets

SYSTEM AND METHOD FOR SECURE REMOTE DIAGNOSTICS

FIELD OF THE DISCLOSURE

This disclosure generally relates to information handling systems, and more particularly relates to a system and method for secure remote diagnostics in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system can perform various self-diagnostic tests to determine the operating status of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
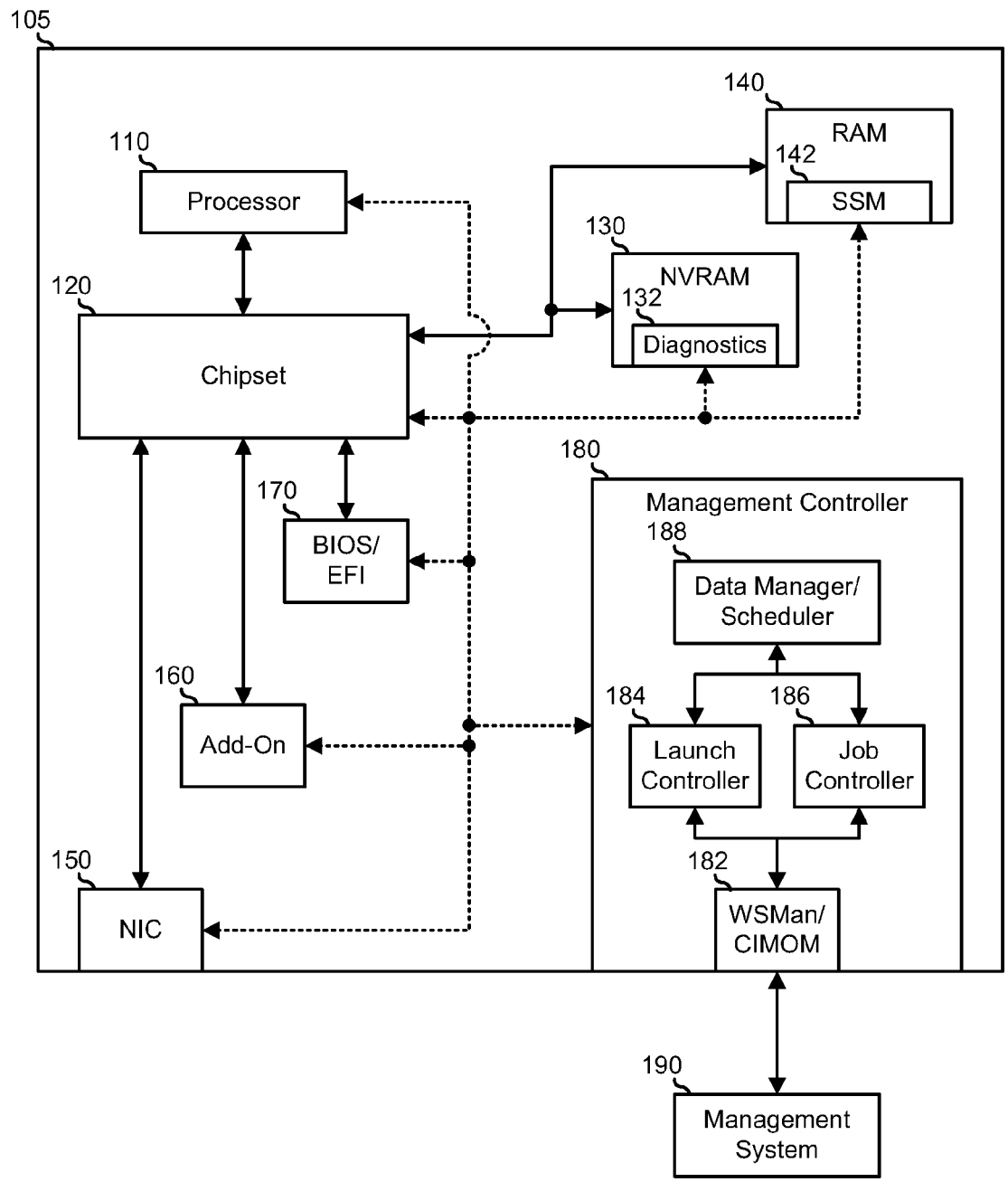
FIG. 1 is a block diagram illustrating a managed system according to an embodiment of the present disclosure.

FIG. 1 illustrates an embodiment of a managed network 100 including a managed system 105 and a management station 190. Managed system 105 is an embodiment of an information handling system that includes a processor 110, a chipset 120, a system non-volatile random access memory (NVRAM) 130, a system RAM 140, a network interface card (NIC) 150, an add-on resource 160, a basic input/output system/extensible firmware interface (BIOS/EFI) module 170, and a management controller (MC) 180. NVRAM 130 represents one or more non-volatile memory devices for providing permanent re-writable memory for managed system 105 and for MC 180. In a particular embodiment, NVRAM 180 represents a secure data storage resource, such as a managed storage and repository (MASER) on an embedded multimedia card (eMMC), and includes data storage and code that can be executed by the processor 110 or by MC 180. As such, NVRAM 130 includes a data partition for the secure and hidden storage of diagnostics 132 for analyzing and evaluating the operating condition of the elements of managed system 105. In a particular embodiment, diagnostics 132 run in an unattended mode and save the result information to a predefined or user-defined storage location such as to RAM 140.

MC 180 is coupled to processor 110, chipset 120, NVRAM 130, RAM 140, NIC 150, add-on resource 160, BIOS/EFI module 170, and management station 190. MC 180 includes a system communication bus that provides an interface between the MC and management system 190 for out-of-band management of managed system 105. In a particular embodiment, MC 180 operates on a power plane of managed system 105 that is separate from the power plane for other elements of the managed system, such that the MC can be operated while the other elements are powered off. In another embodiment, MC 180 operates in a pre-operating-system operating state (e.g. during boot of the system). Commands, communications, or other signals may be sent to or received from MC 190 by management system 190. In a particular embodiment, MC 180 is included on a main circuit board (e.g., a baseboard, a motherboard, or any combination thereof) of managed system 105, integrated onto another element of the managed system such as chipset 120, or another suitable element, as needed or desired. As such, MC 180 can be part of an integrated circuit or a chip set within managed system 105. An example of MC 180 includes a baseboard management controller (BMC), an integrated Dell remote access controller (iDRAC), another controller, or any combination thereof.

MC 180 includes processing elements that can include a service processor, a RAM, an NVRAM, and various data interfaces such as a media access control (MAC) interface, an I²C/SMBus interface, and a serial peripheral interface. The elements of managed system 105 are connected to one or more of the data interfaces, thereby permitting MC 180 to receive information from or send information to the elements of the managed system, and to perform processing tasks on the managed system. MC 180 is also connected to an external network through the MAC interface, thereby permitting the MC to receive information from or send information to management 190, to receive directions for interacting with the elements of managed system 105, for directing the MC to perform processing tasks on the managed system, and to obtain the results of the processing tasks from the MC.

MC 180 includes a web services manager/common information model object manager (WSMan/CIMOM) module 182, a launch controller module 184, and job controller module 186, and a data manager/scheduler module 188. WSMan/CIMOM module 182 operates to provide a web based service interface between MC 180 and management system 190, and a consistent management interface to the management system for managing the elements of managed system 105. WSMan/CIMOM module 182 permits an operator of management system 190 to send commands, either manually or via a command script, to MC 180 to send or receive information from the elements of managed system 105, and to perform processing tasks on the managed system. An example of WSMan/CIMOM module 182 includes a Dell remote access controller administrator (RACADM). WSMan/CIMOM module 182 interacts with launch controller module 184 and job controller module 186 to launch and manage the requests for information from the elements of managed system 105 and to set up the processing tasks for execution on the managed system. An example of a launch controller module includes a Dell Lifecycle controller included in a Dell iDRAC. Data manager/scheduler module 188 operates to manage the flow of information between the elements of managed system 105 and MC 180, and to schedule the execution of the processing tasks on the managed system.

In a particular embodiment, MC 180 operates to remotely and securely schedule and execute diagnostics 132 on managed system 105, to receive the diagnostic results, and to provide the results to management system 190. Here, management system 190 operates to provide a job entry to WSMan/CIMOM module 182. The job entry includes one or more diagnostics to be performed, each represented as command line commands that are executable by diagnostics 132, times at which each associated task is to be run, a location for providing the results of the tasks or direction to return the results to management system 190, and other information as needed or desired to implement the execution of the diagnostics. WSMan/CIMOM module 182 provides the job entry to launch controller 184 to create an associated diagnostics job that is provided to job controller 186. Job controller 186 operates to receive the diagnostics job, and works with data manager/scheduler 188 to launch the diagnostics job on managed system 105, as described further below, to obtain status and result information from the diagnostics job, and to cancel the diagnostics job when in response to an error or to the completion of the diagnostics job. Job controller 186 returns the results to launch controller 184 which exports the results to management system 190.

In launching the diagnostics job, data manager/scheduler 188 operates to reboot managed system 105 into an operating system (OS) agnostic environment such as a unified extensible firmware interface (uEFI) or basic input/output system (BIOS) pre-OS environment, and initiates execution of a system service management (SSM) module 142 which can be stored in a memory of the managed system, such as RAM 140. SSM module 142 operates to create a dynamic partition in RAM 140 via an intelligent platform management interface (IPMI), to copy diagnostics 132 to the dynamic partition, to execute the diagnostics in an unattended mode, to copy the results from the diagnostics to the designated location, and to indicate to job controller module 188 that the diagnostics job has been completed. Then, when job controller module 188 has retrieved the results, SSM module 142 operates to delete the partition, and to delete the results if needed or desired.

Figure 2:
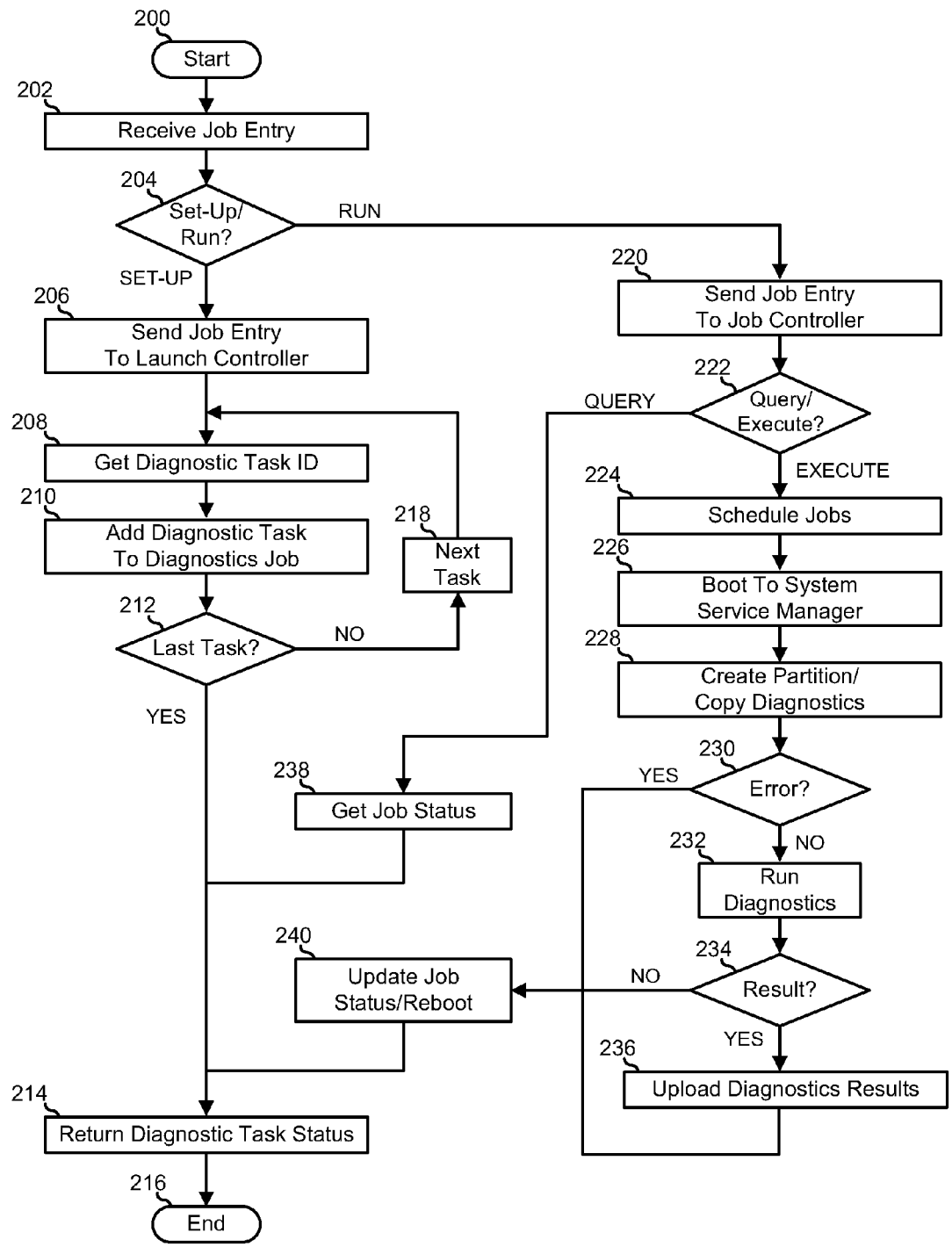
FIG. 2 is a flowchart illustrating a method for secure remote diagnostics in a managed system.

FIG. 2 illustrates a method for secure remote diagnostics in a managed system starting at block 200. A job entry is received at block 202. For example, management station 190 can send a job entry to WSMan/CIMOM module 182. A decision is made as to whether the job entry is a set-up entry or a run entry in decision block 204. If the job entry is a set-up entry, the "SET-UP" branch of decision block 204 is taken and the job entry is sent to a launch controller in block 206. For example, WSMan/CIMOM module 182 can send a job entry to launch controller 184. The launch controller determines a diagnostic task identifier in block 208 and adds the diagnostic task to a diagnostics job in block 210. A decision is made as to whether or not the task is the last task in the job entry in decision block 212. If not, the "NO" branch of decision block 212 is taken, a next task is selected in block 218, and the method returns to block 208 where the launch controller determines a diagnostic task identifier for the next task. If the task is the last task in the job entry, the "YES" branch of decision block 212 is taken, the launch controller returns a diagnostic task status in block 214, and the method ends in block 216.

Returning to decision block 201, if the job entry is a run entry, the "RUN" branch is taken and the job entry is sent to a job controller in block 220. For example, WSMan/CIMOM module 182 can send a job entry to job controller 186. A decision is made as to whether the job entry is a job query job entry or an execute job entry in decision block 222. If the job entry is a job query job entry, the "QUERY" branch of decision block 222 is taken, the launch controller determines the job status in block 238, the method continues in block 214 where the job controller returns the job status, and the method ends in block 216. If the job entry is an execute job entry, the "EXECUTE" branch of decision block 222 is taken and the job is scheduled to be executed in block 224. For example, job controller 186 can provide the job to data manager/scheduler 188 to execute the job. The system is booted to a system service manager in block 226. For example, MC 180 can reboot managed system 105 into an OS agnostic environment, and can execute SSM module 142. The system service manager creates a partition and copies diagnostics code from a hidden partition to the new partition in block 228. Here, SSM module 142 can create a partition and copy diagnostics module 132 to the new partition.

A decision is made as to whether or not there was an error in creating the partition or in copying the diagnostics code in decision block 230. If there was an error, the "YES" branch of decision block 230 is taken, the job status in updated and the system is rebooted in block 240, the method continues in block 214 where the job controller returns the job status, and the method ends in block 216. If there was no error, the "NO" branch of decision block 230 is taken and the diagnostics code is executed in block 232. A decision is made as to whether or not the execution of the diagnostics yielded results in decision block 234. If not, the "NO" branch of decision block 234 is taken, the job status in updated and the system is rebooted in block 240, the method continues in block 214 where the job controller returns the job status, and the method ends in block 216. If the execution of the diagnostics yielded results, the "YES" branch of decision block 234 is taken, the results are uploaded to a location designated for the results in block 236, the job status in updated and the system is rebooted in block 240, the method continues in block 214 where the job controller returns the job status, and the method ends in block 216.

Figure 3:
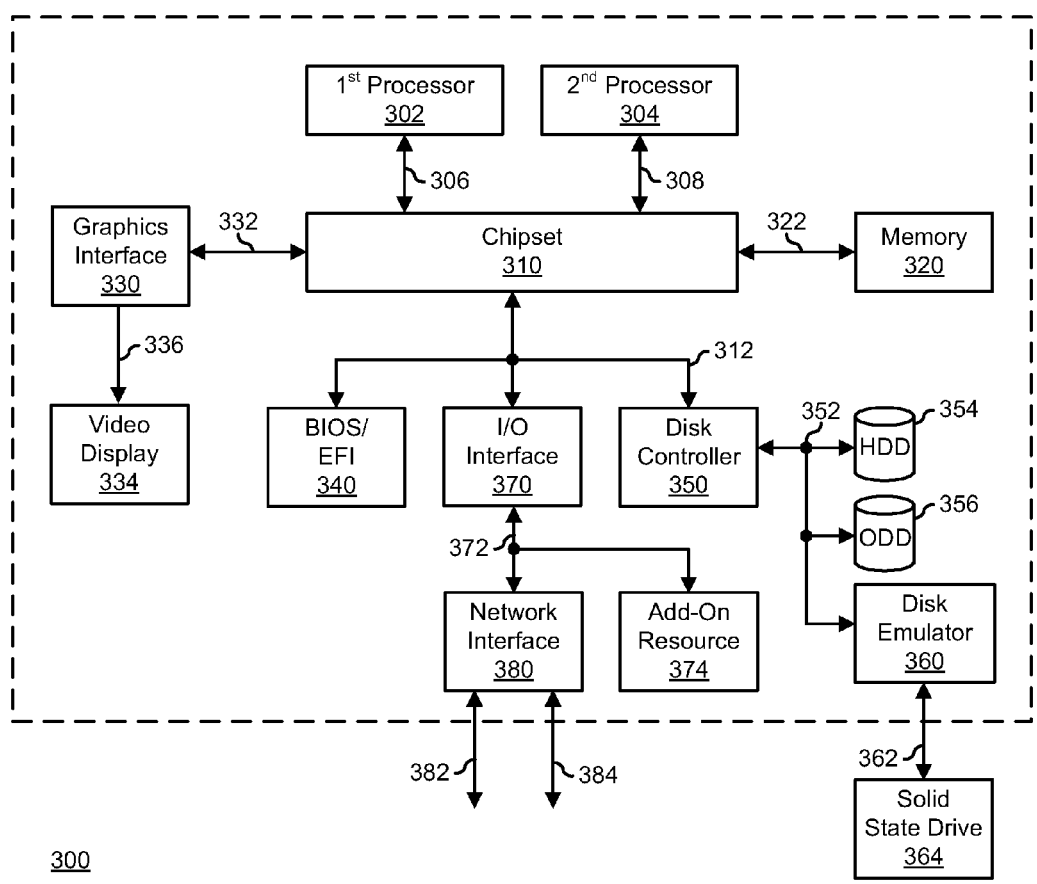
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be coupled to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374 and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor; and
   a management controller separate from the processor, the management controller operable to:
      create a memory partition;
      copy diagnostics code to the memory partition;
      boot the information handling system to a system service management module;
      direct the system service management module to:
         execute the diagnostics code on the processor from the memory partition; and
         store a result from the execution of the diagnostics code in a predetermined memory location; and
      retrieve the result from the predetermined memory location.

2. The information handling system of claim 1, wherein the management controller is further operable to direct the system service management module to:
   delete the memory partition after the management controller retrieves the result.

3. The information handling system of claim 1, wherein the diagnostics code is copied from a hidden partition.

4. The information handling system of claim 1, wherein the management controller is further operable to:
   provide the result to a management station coupled to the management controller.

5. The information handling system of claim 1, wherein:
   the management controller is further operable to receive a job entry from a management station coupled to the management controller; and
   booting the information handling system is in response to receiving the job entry.

6. The information handling system of claim 5, wherein the job entry comprises a job task, the job task including:
   a command to execute the diagnostics code;
   a time at which the diagnostics code is to be run; and
   at the predetermined memory location.

7. A method comprising:
   directing by a management controller of an information handling system, an information handling system to boot to a system service management module;
   creating, by the system service management module, a memory partition;
   copying, by the system service management module, diagnostics code to the memory partition;
   directing, by the management controller, the system service management module to execute the diagnostics code on a processor of the information handling system, wherein the diagnostics code is executed from the memory partition;
   storing, by the system service management module, a result from the execution of the diagnostics code in a predetermined memory location; and
   retrieving, by the management controller, the result from the predetermined memory location.

8. The method of claim 7, further comprising:
   deleting, by the system service management module, the memory partition in response to retrieving the result.

9. The method of claim 7, wherein the diagnostics code is copied from a hidden partition.

10. The method of claim 7, further comprising:
    providing, by the management controller, the result to a management station coupled to the management controller.

11. The method of claim 7, further comprising:
    receiving, by the management controller, a job entry from a management station coupled to the management controller;
    wherein booting the information handling system is in response to receiving the job entry.

12. The method of claim 11, wherein the job entry comprises a job task, the job task including:
    a command to execute the diagnostics code;
    a time at which the diagnostics code is to be run; and
    at the predetermined memory location.

13. A non-transitory computer-readable medium including code for performing a method, the method comprising:
    receiving, by a management controller of an information handling system, a job entry from a management station coupled to the management controller;
    directing by a management controller of an information handling system, the information handling system to boot to a system service management module, wherein booting the information handling system is in response to receiving the job entry;
    directing, by the management controller, the system service management module to execute diagnostics code on a processor of the information handling system;
    storing, by the system service management module, a result from the execution of the diagnostics code in a predetermined memory location; and
    retrieving, by the management controller, the result from the predetermined memory location.

14. The computer-readable medium of claim 13, the method further comprising:
    creating, by the system service management module, a memory partition; and
    copying, by the system service management module, the diagnostics code to the memory partition;
    wherein the diagnostics code is executed from the memory partition.

15. The computer-readable medium of claim 14, the method further comprising:

deleting, by the system service management module, the memory partition in response to retrieving the result.

16. The computer-readable medium of claim 13, the method further comprising:

providing, by the management controller, the result to a management station coupled to the management controller.

17. The computer-readable medium of claim 13, wherein the job entry comprises a job task, the job task including:

a command to execute the diagnostics code;
a time at which the diagnostics code is to be run; and
at the predetermined memory location.

* * * * *